(12) United States Patent
Patel et al.

(10) Patent No.: US 7,340,124 B2
(45) Date of Patent: Mar. 4, 2008

(54) OPTICAL SWITCH USING RARE EARTH DOPED GLASS

(75) Inventors: Falgun D. Patel, Pacifica, CA (US); Jeffrey N. Miller, Los Altos Hills, CA (US)

(73) Assignee: Avago Technologies Fiber IP Pte Ltd, Singapore (SG)

( * ) Notice: Subject to any disclaimer, the term of this patent is extended or adjusted under 35 U.S.C. 154(b) by 151 days.

(21) Appl. No.: 10/820,098

(22) Filed: Apr. 7, 2004

(65) Prior Publication Data
US 2005/0225839 A1     Oct. 13, 2005

(51) Int. Cl.
*H04J 14/00*     (2006.01)
*G02B 6/26*      (2006.01)
*H01S 3/00*      (2006.01)

(52) U.S. Cl. ............................ 385/16; 398/45; 359/333
(58) Field of Classification Search ................... 385/16; 398/45; 359/341.3, 333
See application file for complete search history.

(56) References Cited

U.S. PATENT DOCUMENTS

| | | | | |
|---|---|---|---|---|
| 5,136,670 A | * | 8/1992 | Shigematsu et al. | 385/42 |
| 5,475,528 A | * | 12/1995 | LaBorde | 359/341.5 |
| 5,754,714 A | * | 5/1998 | Suzuki et al. | 385/5 |
| 5,946,428 A | * | 8/1999 | Aleksandrov et al. | 385/11 |
| 6,430,349 B1 | * | 8/2002 | Hayden et al. | 385/132 |
| 6,603,909 B2 | * | 8/2003 | Varner | 385/123 |
| 6,690,873 B2 | * | 2/2004 | Bendett et al. | 385/132 |
| 6,785,434 B2 | * | 8/2004 | Castoldi et al. | 385/14 |
| 2002/0030881 A1 | * | 3/2002 | Nilsson et al. | 359/341.1 |
| 2003/0097858 A1 | * | 5/2003 | Strohhofer et al. | 65/390 |
| 2005/0152429 A1 | * | 7/2005 | Scherer | 372/92 |
| 2005/0163419 A1 | * | 7/2005 | Scherer | 385/16 |

OTHER PUBLICATIONS

Becker et al. Erbium-Doped Fiber Amplfiiers Fundamentals and Technology. Academic Press. pp. 153, 161-171. 1999.*
Hultgren et al. Above and below-band femtosecond nonlinearites in active AlGaAs waveguides. Appl. Phys. Lett. 61 (23), Dec. 7, 1992.*

* cited by examiner

*Primary Examiner*—Deandra M Hughes

(57) ABSTRACT

The present invention provides an optical switch including a loss element having a signal loss, and a rare earth doped gain element optically connected in series with the loss element. The rare earth doped gain element is operable to produce a signal gain. The signal gain and the signal loss are about equal. The present invention also provides a method of optical switching including optically connecting a loss element in series with a rare earth doped gain element and passing an optical signal through the loss element and the gain element. The loss element attenuates the optical signal by a first amount. The method further includes selectively applying an optical pump to the gain element to perform the switching, the gain element amplifying the optical signal by the first amount in response to the optical pump.

13 Claims, 10 Drawing Sheets

OPTICAL SWITCH USING RARE EARTH DOPED GLASS

FIELD OF THE INVENTION

The technical field of this disclosure is optical components, particularly optical switches in rare earth doped glass.

BACKGROUND OF THE INVENTION

Optical on/off switches are used in optical systems for various functions, such as add/drop multiplexers and amplitude modulators. A primary use of on/off switches is to modulate amplitude of continuous wave signals. Additionally, an on/off switch can block of a signal at some location when a broadcast signal is not meant to be received at that location.

Switches often incorporate mirrors or other movable blocking mechanisms. The signal is blocked when a mirror or beam is moved into the path of an optical beam propagating from one waveguide to another. When the mirror is moved out of the path of an optical beam, the beam is coupled to the second waveguide. Moving parts may become stuck in an on or off position so that the signal is permanently blocked or coupled. Material fatigue after extended use also causes failure of moving parts used in on/off switches. The properties of a material forming a micro-electromechanical system (MEMS) hinge, for example, may change after hundreds of rotations, degrading the range of motion available from the hinge.

It would be desirable to have an optical switch that would overcome the above disadvantages.

SUMMARY OF THE INVENTION

The present invention is an optical switch with no moving parts. The optical switch has a loss element and a gain element. The gain element is formed from a waveguide doped with at least one species of rare earth ions. The switch operates to transmit an optical signal from an optical source when pump power is provided to a rare earth doped gain element. The switch will operate to absorb the optical signal when pump power is not provided to a rare earth doped gain element. Turning the pump power on and off switches the optical signal on and off.

One aspect of the present invention provides an optical switch including a loss element having a signal loss and a rare earth doped gain element optically connected in series with the loss element. The rare earth doped gain element is operable to produce a signal gain, with the signal gain and the signal loss being about equal.

Another aspect of the present invention provides a method of optical switching including optically connecting a loss element in series with a rare earth doped gain element and passing an optical signal through the loss element and the gain element. The loss element attenuates the optical signal by a first amount. The method further includes selectively applying an optical pump to the gain element to perform the switching, the gain element amplifying the optical signal by the first amount in response to the optical pump.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

DETAILED DESCRIPTION OF PRESENTLY PREFERRED EMBODIMENTS

Figure 1:
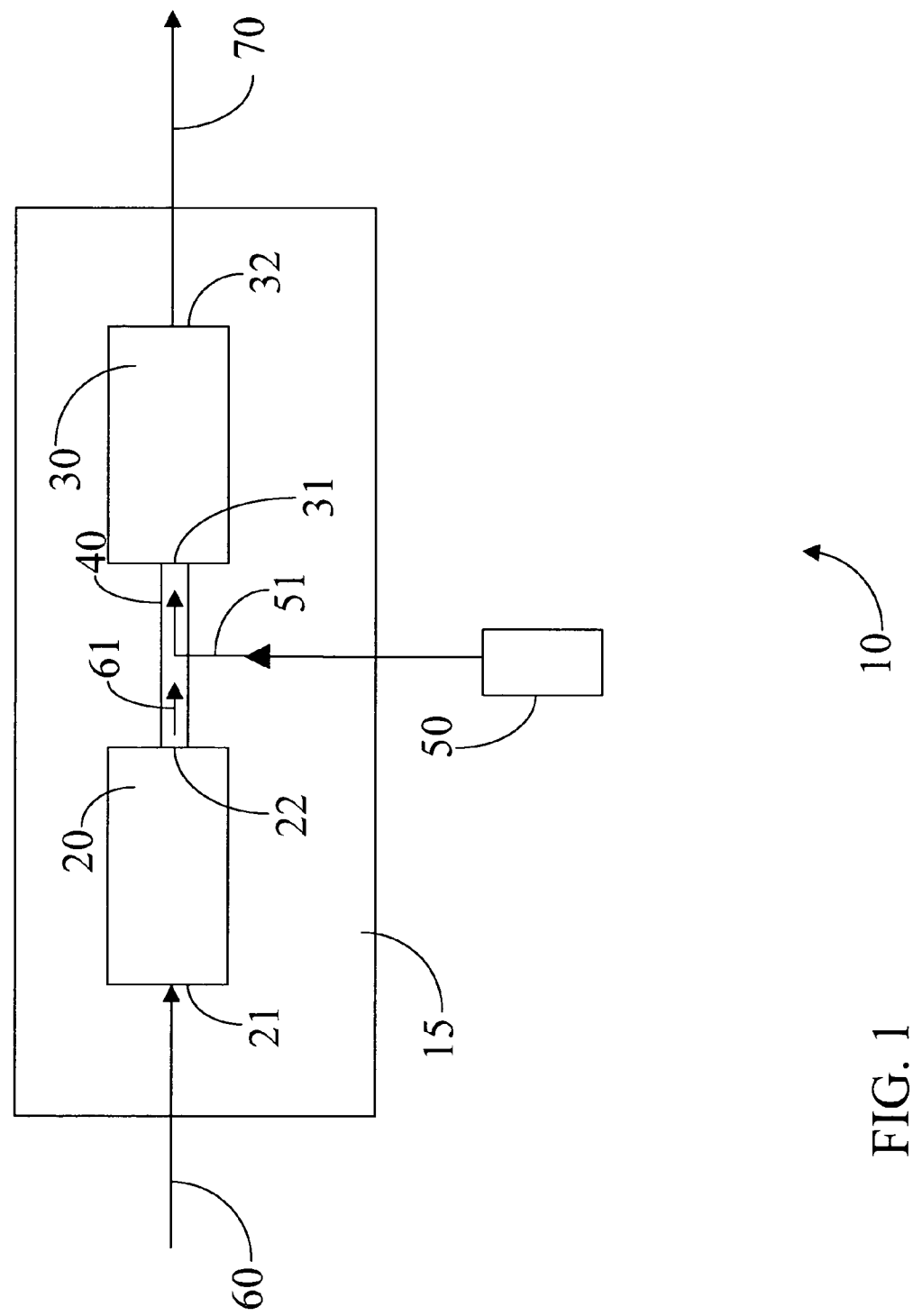
FIG. 1 shows a schematic of an optical switch in accordance with the present invention.

FIG. 1 shows a top view of an optical switch 10, which is composed of a loss element 20 and a gain element 30, both on a supporting substrate 15. An optical pump source 50 is mounted off the supporting substrate 15. In an alternative embodiment, the optical pump source 50 is an edge emitting laser diode attached to or formed within the substrate 15. The loss element 20 has an input endface 21 and an output endface 22. The loss element 20 attenuates input optical signal 60, which is coupled to the input endface 21, and generates attenuated optical signal 61. The output endface 22 is optically coupled to coupling element 40, which transmits attenuated optical signal 61. The gain element 30 has an input endface 31 and an output endface 32. The coupling element 40 couples attenuated optical signal 61 into the input endface 31 of the gain element 30. The gain element 30 generates amplified output optical signal 70.

The optical pump source 50 has an ON state and an OFF state corresponding to the ON state and an OFF state of the optical switch 10. In the ON state, the optical pump source 50 emits an optical pump 51. In the OFF state, no optical pump is emitted. When the optical switch 10 is in the ON state, the optical pump 51 is coupled to the gain element 30, which places the gain element 30 in the ON state. The attenuated optical signal 61 is amplified as it passes through the gain element 30 in the ON state and the amplified output optical signal 70 exits the gain element 30 at output endface 32.

The loss element 20 attenuates the input optical signal 60 to produce the attenuated optical signal 61, which is lower in intensity than the input optical signal 60 by a signal loss amount. When the gain element 30 is ON, the gain element 30 amplifies the attenuated optical signal 61 to produce the amplified output optical signal 70, which is greater in intensity than the attenuated optical signal 61 by a signal gain amount. Because the absolute values of the signal gain and the signal loss are about equal, the amplified output optical signal 70 has about the same intensity as the input optical signal 60. Values of the signal gain and the signal loss that differ by a few decibels will be regarded as being about equal, although in particular applications a much larger difference is acceptable. When the gain element 30 is OFF, the gain element 30 further attenuates the attenuated optical signal 61 and the output from the optical switch 10 is negligible in intensity.

Possible coupling mechanisms by which the input optical signal 60 is coupled to the loss element 20 and by which the coupling element 40 optically communicates with the loss element 20 and the gain element 30 include a lens coupling, an end fire coupling, diffractive coupling, a grating coupler, a fused optical fiber coupler, and combinations thereof. Possible coupling mechanisms by which the optical pump 51 is coupled to the gain element 30 include a diffractive coupler, a y-branch coupler, a directional coupler, a grating coupler, a fused optical fiber coupler, or combinations thereof. The coupling device 40 is a fiber or an optical waveguide. In one embodiment, the coupling device 40 is omitted and the gain element 30 and the loss element 20 are directly coupled by end fire coupling, lens coupling, or a combination thereof.

Figure 2:
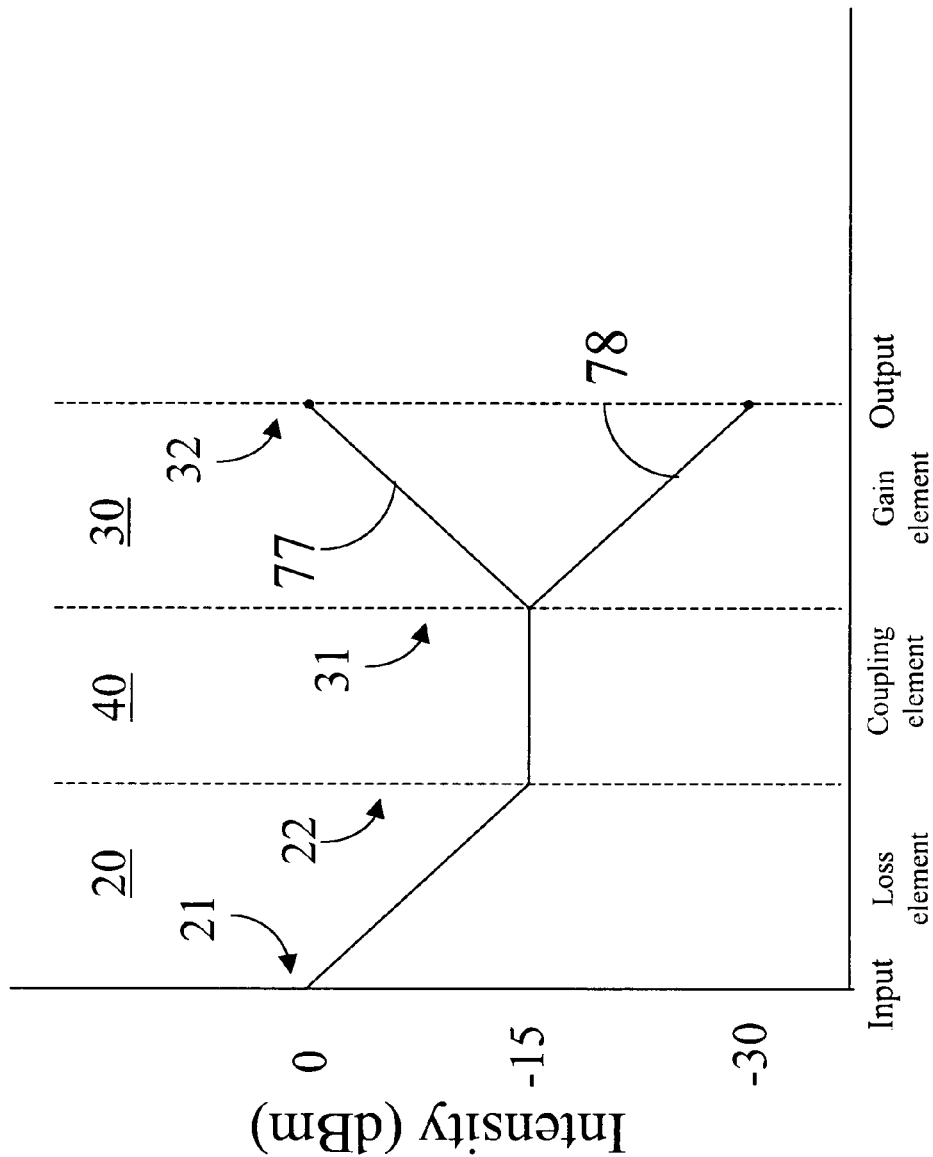
FIG. 2 shows the optical intensity of a signal passing through an exemplary optical switch in the ON and the OFF state.

FIG. 2, in which like elements share like reference numbers with FIG. 1, shows the optical intensity of a signal passing through an exemplary optical switch 10 in the ON and the OFF state. The signal gain in the gain element 30 is designed to be equal to the signal loss in the loss element 20. In this example, the loss element 20 produces a signal loss of 15 dB. The gain element 30 produces a signal gain of 15 dB when the gain element 30 is ON and a loss of 15 dB when the gain element 30 is OFF. The optical switch 10 is ON when the optical pump 51 is coupled to the gain element 30 and the optical switch 10 is OFF when the optical pump 51 is not coupled to the gain element 30.

In an example, the input optical signal 60 is 1 mW or 0 dBm at the input endface 21 of loss element 20. After propagating through the loss element 20 the input optical signal 60 is attenuated by 15 dB and has an optical intensity of about 30 μW or −15 dBm. The attenuated optical signal 61 is emitted from output endface 22 of loss element 20 and propagates without appreciable loss or gain through the coupling element 40 to the input endface 31 of the gain element 30.

Attenuated optical signal 61 propagates through the gain element 30 and experiences a 15 dB gain when the optical switch 10 is in the ON state. Line 77 shows how the attenuated optical signal 61 gains intensity as it passes through the gain element 30 with an optical pump 51. An amplified output optical signal 70 is emitted from output endface 32 of at the same optical intensity of 1 mW or 0 dBm as the input optical signal 60. The optical signal is amplified by a gain that offsets the signal loss of the attenuated optical signal 61 in the loss element 20, since for this exemplary optical switch 10 the signal gain of gain element 30 equals the absolute value of the signal loss of loss element 20. The amplification in the gain element results from stimulated emission from optically pumped rare earth ions.

The gain element 30 further attenuates optical signal 61 when no optical pump 51 is propagating in the gain element 30. Attenuated optical signal 61 propagates through the gain element 30 and experiences a −15 dB loss when optical pump 51 is not coupled to the gain element 30. Line 78 shows how the attenuated optical signal 61 loses intensity as it passes through the un-pumped gain element 30. Attenuated output optical signal 70 is emitted from output endface 32 with an optical intensity of 1 μW or −30 dBm. This exemplary optical switch 10 has an on/off ratio of 1000/1. The attenuated output optical signal 70 can be attenuated with respect to the intensity of input optical signal 60 within the range of −10 dB to more than −90 dB depending on the switch design.

Figure 3:
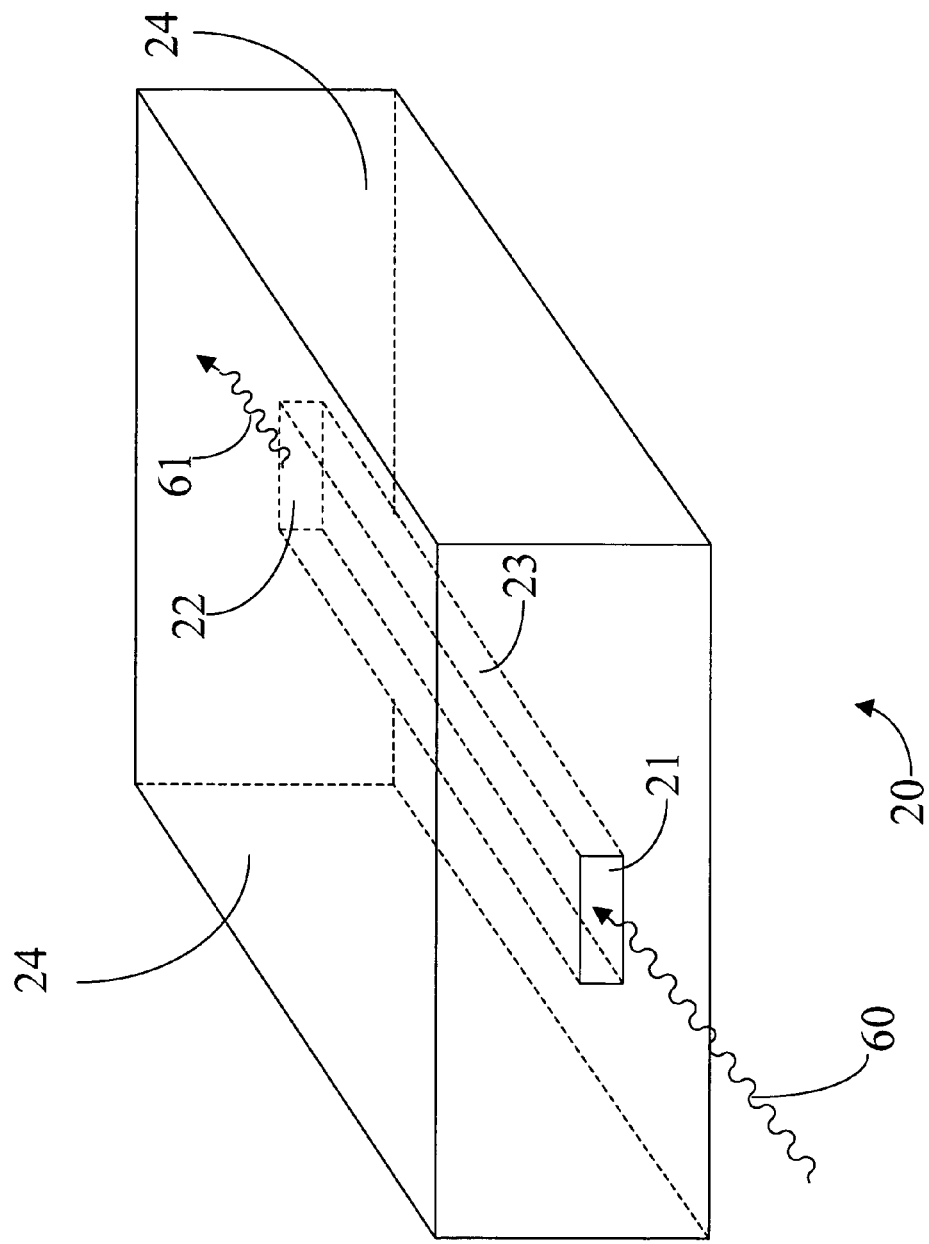
FIG. 3 shows a schematic of the loss element.

FIG. 3 shows the loss element 20. In this embodiment, the loss element 20 is a waveguide composed of a core 23 heavily doped with at least one species of rare earth ion (not shown), a cladding 24, an input endface 21, and an output endface 22. The core 23 is surrounded at least in part by cladding 24. The cladding 24 has a cladding index of refraction, which is less than the core index of refraction of the core 23. The cladding 24 may also be heavily doped with at least one species of rare earth ion. The waveguide of loss element 20 is connected to receive the input optical signal 60. The loss element 20 supports propagation of one or more optical modes of radiation above a certain wavelength. In an alternative embodiment, the loss element 20 is a ridge-loaded waveguide formed by disposing a lower index material having a desired width and length on a planar waveguide heavily doped with at least one species of rare earth ion.

As the input optical signal 60 propagates through the loss element 20, it is absorbed by the un-pumped rare earth ions in the loss element 20 and is thereby attenuated. The attenuated optical signal 61 exits loss element 20 at the output endface 22.

In an alternative embodiment, the loss element 20 is an un-doped waveguide, i.e., a waveguide which is not doped with a rare earth ion, although the waveguide may be doped with other elements as desired. The material or combination of materials forming the loss element 20 absorbs light at the wavelength of the input optical signal 60 while supporting propagation of one or more optical modes of radiation at that wavelength. The optical pump 51 may be coupled into the input endface 21 of loss element 20 when the un-doped waveguide of the loss element 20 is not absorbing or is minimally absorbing at the wavelength of the optical pump 51.

In another alternative embodiment, the loss element 20 is a length of absorbing material, such as a neutral density filter, which absorbs light at the wavelength of the input optical signal 60. The optical pump 51 may be coupled into the input endface 21 of the loss element 20 when the length of absorbing material of the loss element 20 is not absorbing or is minimally absorbing at the wavelength of the optical pump 51.

Figure 4:
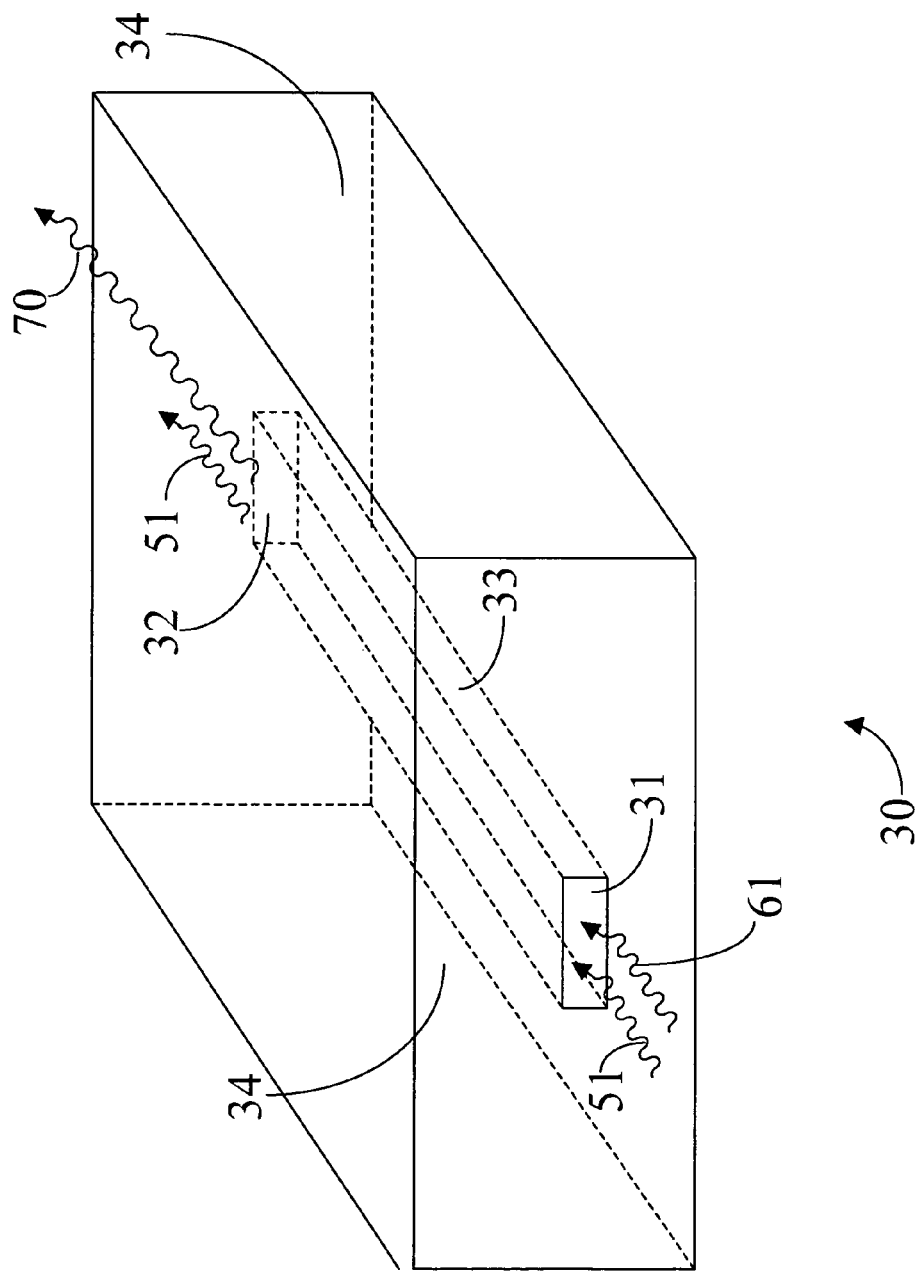
FIG. 4 shows a schematic of the gain element.

FIG. 4 shows the gain element 30. The gain element 30 is a waveguide composed of a core 33 heavily doped with at least one species of rare earth ion (not shown), a cladding 34, an input endface 31, and an output endface 32. The core 33 is surrounded at least in part by cladding 34. The cladding 34 has a cladding index of refraction, which is less than the core index of refraction of the core 33. The cladding 34 may also be heavily doped with at least one species of rare earth ion. The waveguide of gain element 30 is connected to receive an attenuated optical signal 61 and an optical pump 51. The gain element 30 supports propagation of one or more optical modes of radiation above a certain wavelength. In an alternative embodiment, the gain element 30 is a ridge-loaded waveguide formed by disposing a lower index material having a desired width and length on a planar waveguide heavily doped with at least one species of rare earth ion. The loss element 20 and the rare earth doped gain element 30 are in optical communication and the rare earth doped gain element 30 has a gain responsive to the optical pump 51.

The gain element 30 amplifies the attenuated optical signal 61 when the optical switch 10 is ON and attenuates the attenuated optical signal 61 when the optical switch 10 is OFF. In the ON state, the optical pump 51 excites the rare earth ions (not shown) in the core 33. The amplification of attenuated optical signal 61 is a result of excitation of rare earth ions in the gain element 30 by the optical pump 51.

The heavy rare earth doping of the core 33 amplifies the attenuated optical signal 61 as attenuated optical signal 61 propagates through the gain element 30 of the optical switch 10 when the optical switch 30 in the ON state. The amplified output optical signal 70 and the optical pump 51 exit the gain element 30 at the output endface 32. The intensity of amplified output optical signal 70 equals the intensity of the input optical signal 60 when the signal gain of gain element 30 equals the absolute value of the signal loss of loss element 20.

The optical switch 10 is OFF when the optical pump 51 is OFF, because no optical pump propagates in the core 33 to excite the rare earth ions (not shown). The heavy doping of rare earth ions in the core 33 further attenuates attenuated optical signal 61 as the attenuated optical signal 61 propagates through the gain element. When the optical switch 10 is OFF, the output optical signal 70 has a very low intensity which can range from one tenth ($1/10$) to less than one thousandth ($1/1000$) of that of the input optical signal 60, depending on the particular design of the optical switch 10.

The loss element 20 and the gain element 30 are shown with identical structures in the present example for clarity, although in other embodiments the loss element 20 is an un-doped waveguide or a neutral density filter. The loss element 20 and the gain element 30 are waveguides with cores and claddings. The cladding materials need not have the same index of refraction on all sides of the core. The cladding index of refraction, the core index of refraction, and the geometry of the core (the width and the thickness), all affect the modal structure of light at a wavelength propagating in the waveguide. Telecommunication systems generally use single mode fibers to transmit optical signals in the wavelength region of 1.5 µm, so it is desirable that the loss element 20 and the gain element 30 of the optical switch 10 are single mode at the wavelength of 1.5 µm for telecommunications applications. In one embodiment, the optical signal 60 to be attenuated has a wavelength in the range of 1.5 µm to 1.7 µm.

Glasses host the rare earth dopants in the core 22 and cladding 24 of the loss element 20 and in the core 33 and cladding 34 of the gain element 30. Glasses are covalently bonded molecules in the form of a disordered matrix with a wide range of bond lengths and bond angles. Phosphate, tellurite, and borate glasses can accept a high concentration of rare earth ions, including $Er^{3+}$ ions. The high solubility of rare earth ions in these glasses permits high signal gain in the gain element 30 and the high signal loss in the loss element 20. Typically, the cores 23 and 33 are formed of phosphate, tellurite, or borate glasses heavily doped with at least one species of rare earth ion. The claddings 24 and 34 are typically formed of the same type of glasses as the cores 23 and 33. When claddings 24 and 34 are not doped with rare earth dopants, the dopants in the cores 23 and 33 ensure the index of refraction of the cores 23 and 33 is higher than the index of refraction of the claddings 24 and 34.

In an alternative embodiment, phosphate, tellurite, or borate glasses heavily doped with at least one species of rare earth ion form the cores 23 and 33 and the claddings 24 and 34. When the cores 23 and 33 and the claddings 24 and 34 are identically doped with rare earth ions, an additional dopant is injected or diffused into the cores 22 and 32 to increase the index of refraction of the cores 23 and 33. In one embodiment, a patterned diffusion of silver ions is used to increase the index of refraction of the cores 23 and 33.

When the core and the cladding are doped with different species of rare earth ions, the dopants are selected so that the core has a higher index of refraction than the cladding. In this way, the core 23 of the loss element 20 supports at least one mode of input optical signal 60 and the core 33 of the gain element 30 supports at least one mode of attenuated signal 60 and optical pump 51.

The loss within the loss element 20 of the optical switch 10 results from absorption of the input optical signal 60 by the rare earth ions. In alternative embodiments, the loss element 20 is a neutral density filter or an un-doped waveguide, which absorb light at the wavelength of the input optical signal 60 and the loss results from their particular absorption characteristics.

The amplification within the gain element 30 of the optical switch 10 results from excitation of the rare earth ions by the optical pump 51. Rare earth ions or lanthanides range from lanthanum with an atomic number of 57 to lutetium with an atomic number of 71, and are lanthanum, cerium, praseodymium, neodymium, promethium, samarium, europium, gadolinium, terbium, dysprosium, holmium, erbium, thulium, ytterbium, and lutetium.

Various rare earth doping concentrations in the cores 23 and 33 can be used in optical switch 10. In one embodiment, the cores 23 and 33 are doped with $Er^{3+}$ in the the range of 5 to 30 wt %. Typically, the cores 23 and 33 are doped with $Er^{3+}$ in the range of 7 to 9 wt %. This dopant level is high enough to produce sufficient signal loss in a loss element 20 less than a few centimeters long and sufficient signal gain in a gain element 30 less than a few centimeters long.

Phosphate, tellurite, or borate glasses accept 5 to 75 wt % of a single species of rare earth ion without precipitation. However, ion clusters may form at higher levels of the dopant. Ion clusters promote ion self-interactions so that the absorbed optical pump 51 is exchanged between clustered ions and does not promote amplification of the attenuated optical signal 61. Thus, ion clusters deplete the pump power available for amplification as pump power is absorbed to excite ion self-interactions. Amplification is quenched if too many ion clusters form. In order to prevent the formation of ion clusters, a second species of rare earth ion is added as a second dopant to the glass.

If the dopant level of the second species is about equal to that of the first species, the second species will decrease the probability of ion cluster formations of either species. A rare earth ion of either species is half as likely to be positioned next to a rare earth ion of the same species. The probability of large ion clusters forming is reduced even more. Thus, mixing different species of rare earth ions reduces ion cluster formations of either species.

In addition, the absorption cross section of the optical pump 51 in glass doped with rare earth ions is larger than the absorption cross section of the optical pump 51 of the species alone. By doping a phosphate, tellurite or borate glass with two or more species of rare earth ion, more optical pump 51 is absorbed to provide gain of attenuated optical signal 61 within the gain element 30 of optical switch 10. In addition, doping a phosphate, tellurite or borate glass with two or more species of rare earth ion results in a larger portion of input optical signal 60 being absorbed within the loss element 20 of optical switch 10. This increases attenuation of the input optical signal in the rare earth loss element 20. This also increases amplification of the attenuated optical signal in the rare earth gain element 30 when pump power 51 is coupled to the rare earth gain element and increases attenuation of the attenuated optical signal 61 in the rare earth gain element when pump power 51 is not coupled to the rare earth gain element.

In one embodiment, the core 23 of the loss element 20 of optical switch 10 is doped with $Er^{3+}$ in the range of 5 to 75 wt % and $Yb^{3+}$ in the range of 7 to 35 wt %. The core 33 of gain element 30 of optical switch 10 is doped with $Er^{3+}$ in the range of 5 to 75 wt % and $Yb^{3+}$ in the range of 7 to 35 wt %. In another embodiment, the core 23 of the loss element 20 of optical switch 10 is doped with $Er^{3+}$ in the range of 5 to 30 wt % and $Yb^{3+}$ in the range of 7 to 35 wt %. The core 33 of gain element 30 of optical switch 10 is doped with $Er^{3+}$ in the range of 5 to 30 wt % and $Yb^{3+}$ in the range of 7 to 35 wt %. Typically, the core 23 of the loss element 20 is doped with $Er^{3+}$ in the range of 7 to 9 wt % and with $Yb^{3+}$ in the range of 11 to 13 wt %, while the core 33 of gain element 30 is doped with $Er^{3+}$ in the range of 7 to 9 wt % and with $Yb^{3+}$ in the range of 11 to 13 wt %.

Figure 5:
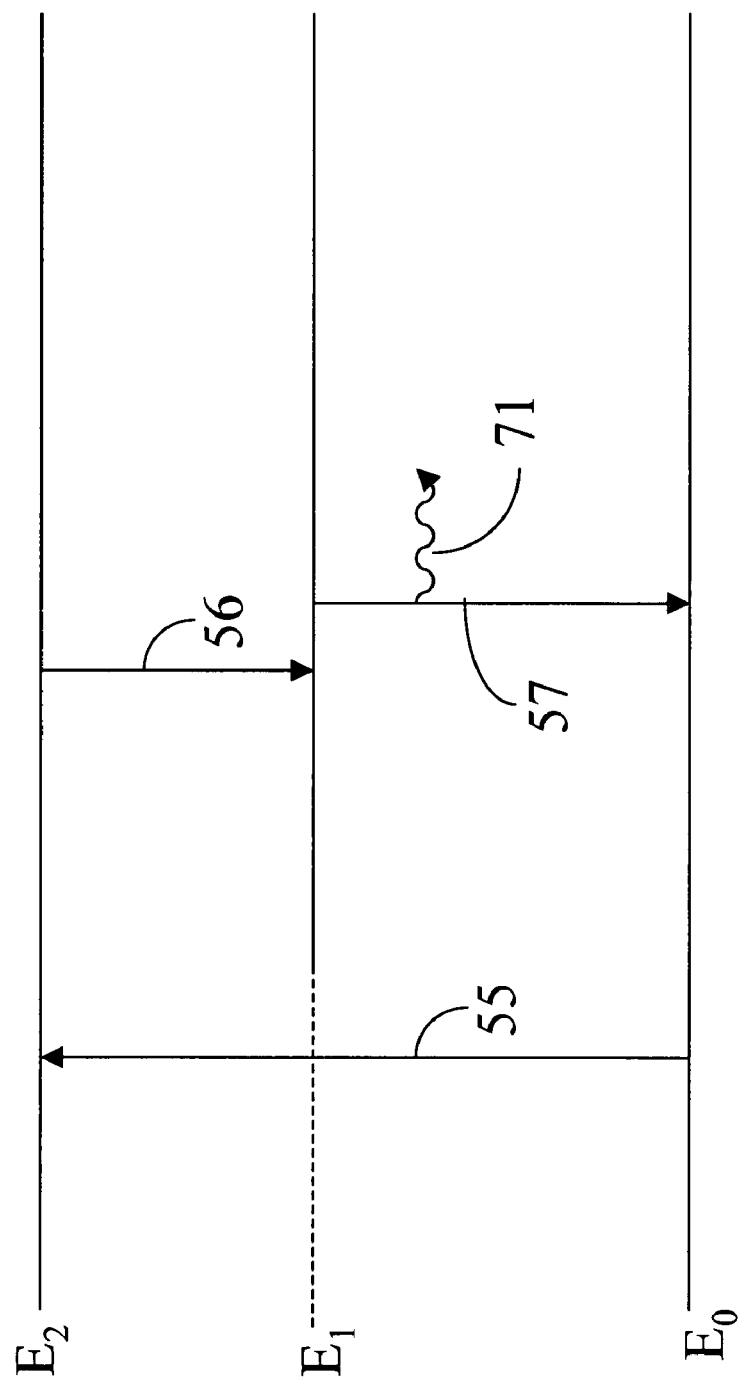
FIG. 5 shows an energy level diagram for a three level system for an exemplary erbium ion $Er^{3+}$.

FIG. 5 shows an energy diagram of the three level system for an exemplary erbium ion $Er^{3+}$. Ionization of the rare earth ions normally forms a trivalent state. For example, the rare earth ion erbium ($Er^{3+}$) has a three level system with stimulated emission transitions at wavelengths of 0.80 µm, 0.98 µm, and 1.55 µm. An optical pump power at wavelength of 0.98 µm excites the erbium ion from the ground state $E_0$ to the energy level $E_2$, as illustrated by arrow 55. The ion experiences a rapid decay from energy level $E_2$ to the energy level $E_1$, as illustrated by arrow 56. The erbium ion $Er^{3+}$ drops from the $E_1$ energy level to the ground state $E_0$, as illustrated by arrow 57, emitting a photon 71 having a wavelength of about 1.55 µm. The emitted photon 71 has a probability of being emitted within a range of wavelengths centered about the wavelength of 1.55 µm due to the fine structure of the ion energy levels (not shown).

The higher the level of doping of the rare earth ions in the loss element and the gain element, the higher the attenuation and amplification in the loss element and the gain element, respectively. The higher the attenuation and amplification, the shorter the optical switch needs to be for a desired ON/OFF ratio. The attenuated optical signal at a wavelength within the gain spectrum of an exemplary rare earth ion may be designed to propagate with an optical pump power in the gain element 30. When the optical pump 51 is at the wavelength needed to excite the rare earth ions, the attenuated optical signal 61 will be amplified after propagating a short distance by the photons 71. The photons 71 are emitted by a stimulated process as the excited rare earth ions drop into the ground state $E_0$.

Figure 6:
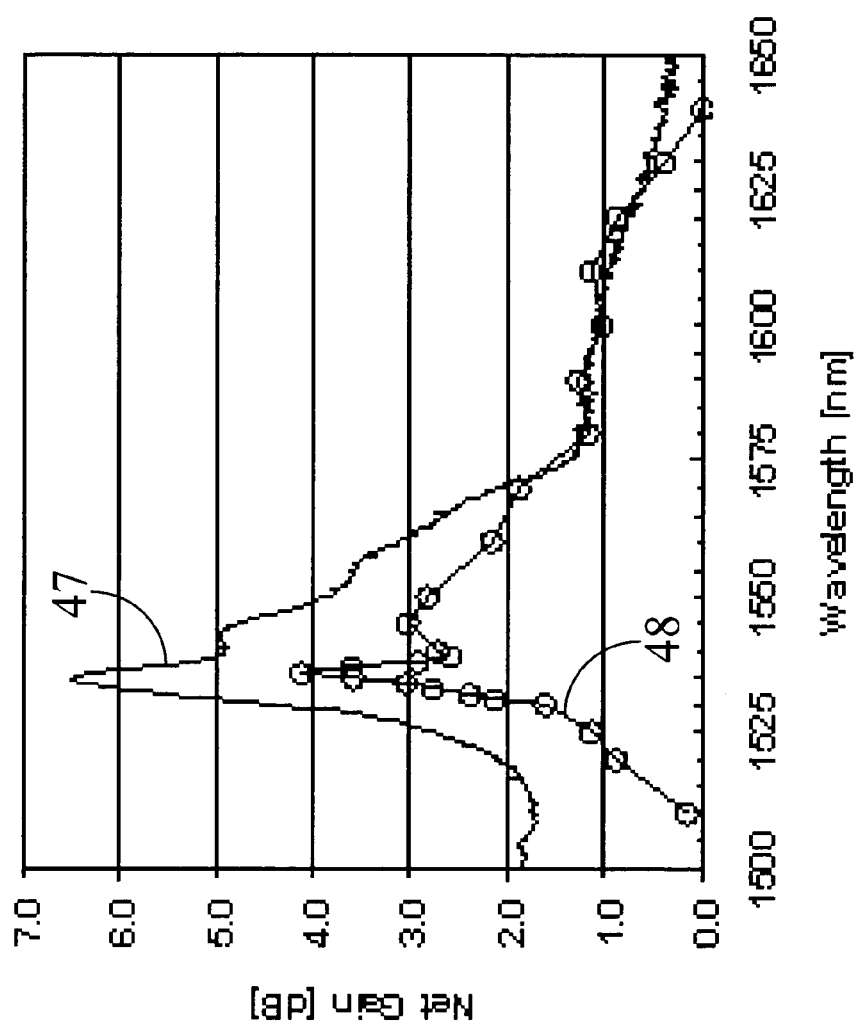
FIG. 6 shows measured and theoretical gain spectra for a gain element made in accordance with the present invention.

FIG. 6 shows the theoretical gain spectrum 47 of a gain element formed from phosphate glass heavily doped with erbium and ytterbium. In this example, the dopant level is about 8 wt % $Er^{3+}$ and about 12 wt % $Yb^{3+}$. Such glass is available from Schott Corporation (number IOG-1). FIG. 6 also shows the measured gain spectrum 48 for an actual gain element. These experimental results show that amplification is possible in a short gain element. The core of the gain element was formed in the 8 wt % $Er^{3+}$ and 12 wt % $Yb^{3+}$ doped phosphate glass by diffusion of silver ions. The core dimensions were 13 µm wide and 5 µm thick. Air formed the top cladding layer for the core and the phosphate glass substrate formed the bottom and side cladding. A 3 mm length of the gain element amplified an input signal at 1.534 µm by 4 dB when an input optical pump power of less than 180 mW at 0.974 µm was coupled to the gain element. As the optical pump power is increased above 180 mW at 0.974 µm the amplification increases to more than 6 dB. Increasing the optical pump power, increasing the gain element length, or increasing both the optical pump power and the gain element length increases the amplification as required for a particular application, such as increasing the amplification to 15 dB. Other changes in the gain element also increase the amplification, such as applying an encapsulating top cladding layer reduces the scattering loss and increases the overall transmission in the gain element.

Figure 7:
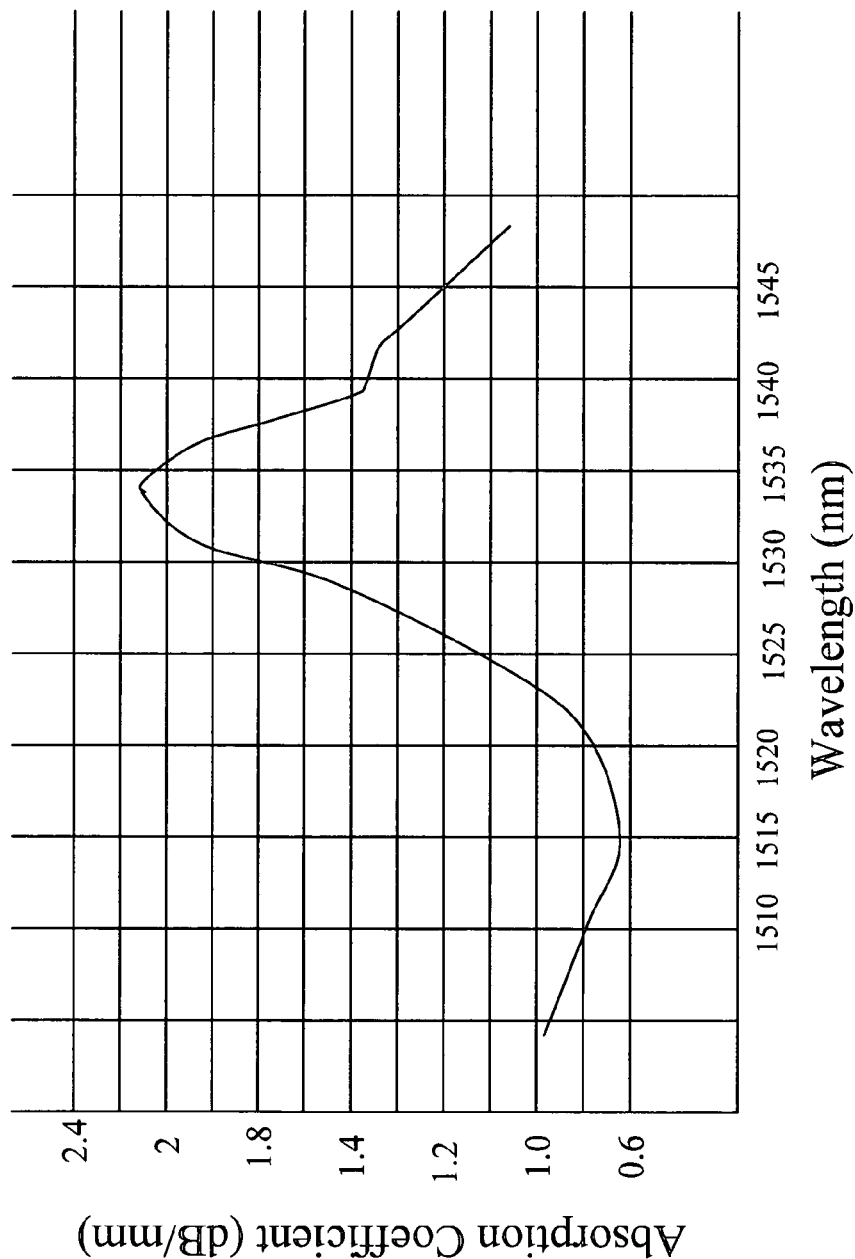
FIG. 7 shows an absorption coefficient curve for a loss element made in accordance with the present invention.

FIG. 7 shows the absorption coefficient in dB/mm as a function of wavelength for phosphate glass doped with 8 wt % $Er^{3+}$ and 12 wt % $Yb^{3+}$. The peak absorption of more than 2.0 dB per mm at the wavelength of 1.534 µm wavelength. For a loss element 20 formed in the same manner as the gain element 30 described above in conjunction with FIG. 6 the loss will be about 2 dB per mm for a signal at a wavelength of 1.534 µm. The loss would be similar in gain element 30 without the optical pump 51 applied.

When the loss element 20 is a neutral density filter or an absorbing waveguide, the material comprising the filter or waveguide is chosen for its absorption spectral characteristics. The loss of input optical signal 60 after propagating through loss element 20 is a function of the propagation length-absorption coefficient product at the wavelength of input optical signal 60. The propagation length-absorption coefficient product is used in the design of the loss element 20 to provide a loss that is offset by the gain when the gain element 30 is in the ON state.

Figure 8:
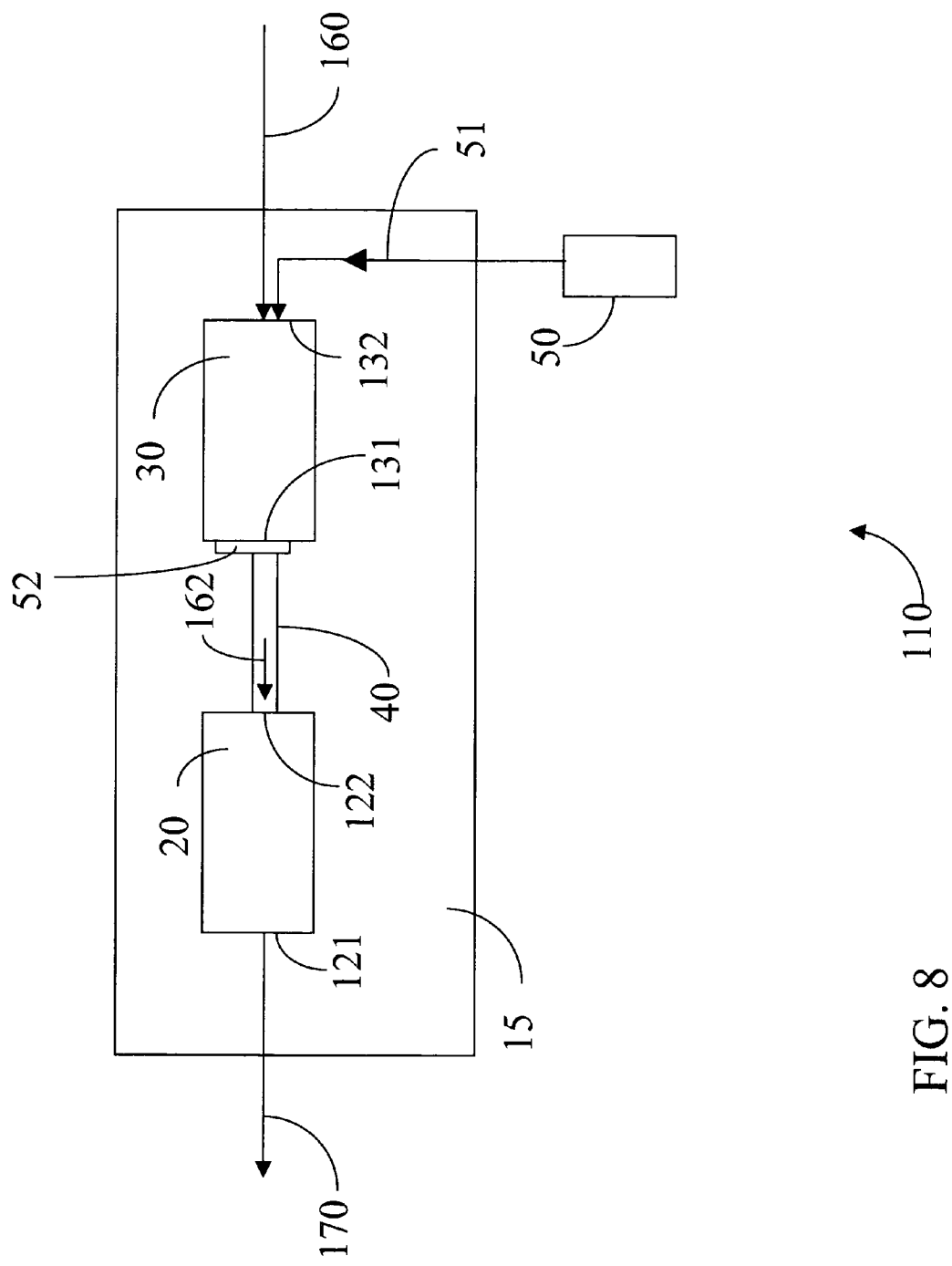
FIG. 8 shows a schematic of an optical switch in accordance with the present invention operating in a reverse mode.

FIG. 8, in which like elements share like reference numbers with FIG. 1, shows a top view of an alternative embodiment of an optical switch 110 in which the input optical signal 160 is coupled to the gain element 30 instead of the loss element 20. The embodiment of FIG. 8 is similar to the embodiment of FIG. 1, except that the input faces and output faces are reversed. A filter 52 is placed between to the output endface 131 and coupling element 40 to absorb or reflect optical pump 51. In an alternative embodiment, no filter is necessary when the loss element 20 is a neutral density filter or an un-doped waveguide, which absorbs light at the wavelength of the input optical signal 160.

The optical switch 110 is in the ON state when the optical pump 51 is coupled to the gain element 30. The input optical signal 160 is coupled to input endface 132 of the gain element 30, is amplified when passing through the gain element 30, and exits the output endface 131 as intermediate signal 162. The intermediate signal 162 passes through the filter 52 and is coupled to the coupling element 40. The filter 52 absorbs or reflects the optical pump 51, so that the optical pump 51 is not input into the loss element 20 and the loss element 20 does not act as a gain element. The coupling element 40 transmits the intermediate signal 162 to the input endface 122, where the intermediate signal 162 is coupled to the loss element 20. The loss element 20 attenuates the intermediate signal 162, which exits the output endface 121 as output optical signal 170.

The optical switch 110 is in the OFF state when optical pump 51 is not coupled to the gain element 30. The input optical signal 160 is coupled to input endface 132 of the gain element 30, is attenuated when passing through the gain element 30, and exits the output endface 131 as intermediate signal 162. The intermediate signal 162 passes through the filter 52 and is coupled to the coupling element 40. The coupling element 40 transmits the intermediate signal 162 to the input endface 122, where the intermediate signal 162 is coupled to the loss element 20. The intermediate signal 162 is additionally attenuated by the loss element 20 and exits output endface 121 as output optical signal 170. When the optical switch 110 is in the OFF state, the input optical signal 160 is attenuated in the range of −10 dB to −90 dB or more, depending on the design of optical switch 110. In an alternate embodiment of optical switch 110, the filter 52 is placed between the coupling element 40 and the input endface 122 of loss element 20.

Figure 9:
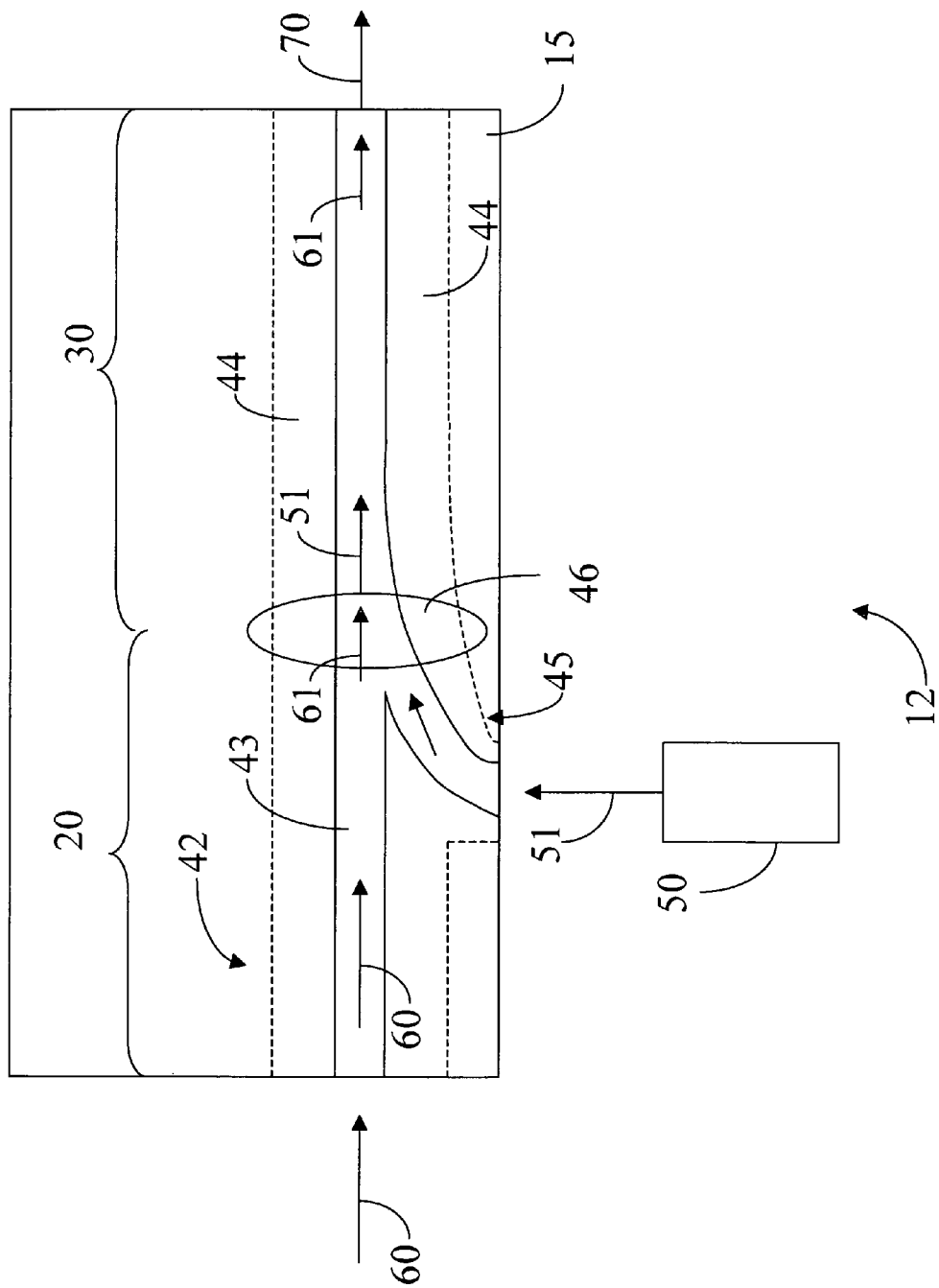
FIG. 9 shows a schematic of an optical switch in accordance with the present invention.

FIG. 9, in which like elements share like reference numbers with FIG. 1, shows an optical switch 12 in which the gain element 30 and the loss element 20 share a common waveguide 42. The core 43 of waveguide 42 is heavily doped with at least one species of rare earth ion and is surrounded by cladding 44 at least in part. The single waveguide 42 of optical switch 12 obviates the need for coupling element 40 of optical switch 10 as shown in FIG. 1. The optical switch 12 is a rare earth doped waveguide 42 connected to receive the optical pump 51 at a coupling region 46, which is located part way along the waveguide 42. The optical pump 51 is coupled to the waveguide 42 in a coupling region 46 formed by a Y-branch waveguide 45 of waveguide 42 intersecting the waveguide core 42. The gain element 30 begins at the coupling region 46 where the optical pump 51 enters the single core 43. The optical pump source 50 is aligned with and coupled to the Y-branch waveguide 45. The waveguide 42 and the branch waveguide 45 are supported by substrate 15.

In one embodiment, the optical pump 51 is coupled to waveguide 42 via the branch waveguide 45 at the midsection of the waveguide 42. This ensures that the signal gain in the gain element 30 and the absolute value of signal loss in the loss element 20 are approximately equal. In alternative embodiments, the optical pump 51 is coupled to the coupling region of waveguide 42 with a diffractive coupler, a directional coupler, a grating coupler, or a combination thereof.

Figure 10:
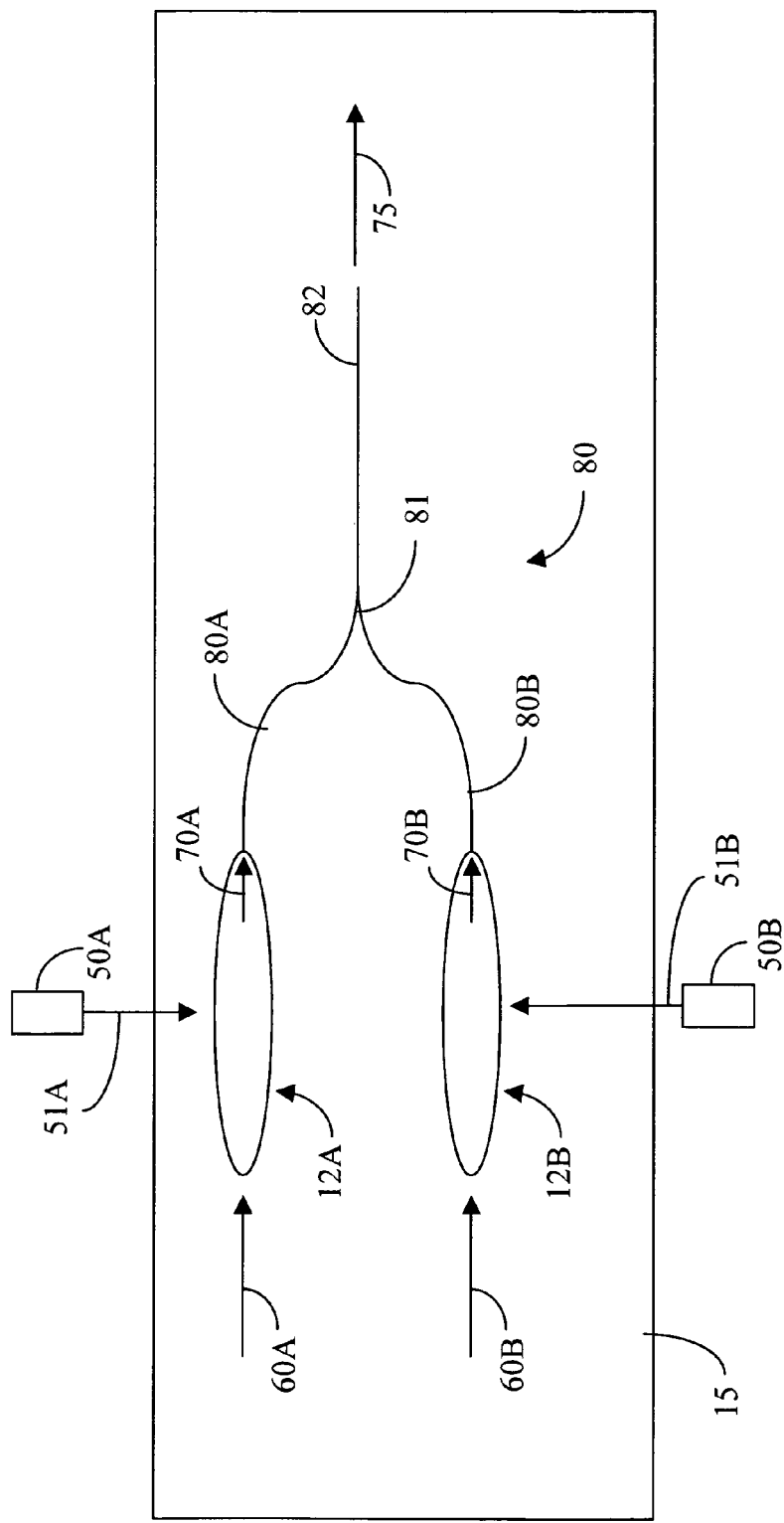
FIG. 10 shows a schematic of optical switches in parallel in accordance with the present invention.

FIG. 10 shows a block diagram illustrating use of two optical switches 12 in parallel on a substrate 15. Like elements of FIG. 10 share like reference numbers with FIG. 9, with the letters A or B appended to distinguish duplicate elements in FIG. 10. The optical switches 12A and 12B are shown schematically as ovals. The output branch 82 may be coupled to an optical fiber in a telecommunications system.

Input optical signals 60A and 60B are coupled into the optical switches 12A and 12B, respectively. Input optical pump sources 50A, 50B emit optical pumps 51A, 51B to place the optical switches 12A, 12B in an ON state. Y-shaped optical waveguide 80 comprises a first input branch 80A, a second input branch 80B and an output branch 82. The first input branch 80A and the second input branch 80B are joined at the Y-junction 81 to optically couple to the single output branch 82.

When the optical switch 12A is ON because the optical pump 50A is provided to the optical switch 12A, and the optical switch 12B is OFF, the input signal 60A is output from the output branch 82 as the output optical signal 75. When the optical switch 12B is ON because the optical pump 50B is provided to the optical switch 12B, and the optical switch 12A is OFF, the input signal 60B is output from the output branch 82 as the output optical signal 75. When both the optical switches 12A and 12B are ON, both input signals 60A and 60B are output from the output branch 82 as the output optical signal 75. In one embodiment, the optical signals 60A and 60B are at different wavelengths.

While the embodiments of the invention disclosed herein are presently considered to be preferred, various changes and modifications can be made without departing from the scope of the invention. The scope of the invention is indicated in the appended claims, and all changes that come within the meaning and range of equivalents are intended to be embraced therein.

We claim:

1. An optical switch, comprising:
   a substrate;
   a loss element having a signal loss;
   a rare earth doped gain element optically connected in series with the loss element, the rare earth doped gain element operable to produce a signal gain in response to an optical pump; and
   an optical pump source operably connected to the rare earth doped gain element, the optical pump source operable to produce the optical pump in an ON state and no optical pump in an OFF state;
   in which the loss element is configured to provide a predetermined signal loss and the rare earth doped gain element is configured to provide a predetermined signal gain, in which the absolute value of the signal gain and the absolute value of the signal loss are about equal.

2. The optical switch of claim 1, in which the loss element comprises a waveguide including a core and a cladding, the cladding at least partially surrounding the core, in which the core is doped with at least one species of rare earth ion in the range of 5 to 75 wt %.

3. The optical switch of claim 2, in which the at least one species of rare earth ion is $Er^{3+}$.

4. The optical switch of claim 2, in which the at least one species of rare earth ion comprises $Er^{3+}$ and $Yb^{3+}$.

5. The optical switch of claim 2, in which the cladding is doped with at least one species of rare earth ion.

6. The optical switch of claim 1, in which the loss element comprises one of a rare earth doped waveguide, an un-doped waveguide, and a neutral density filter.

7. The optical switch of claim 1, in which the rare earth doped gain element comprises a waveguide including a core and a cladding, the cladding at least partially surrounding the core, in which the core is doped with at least one species of rare earth ion in the range of 5 to 75 wt % and in which the waveguide core is connected to receive optical pump power of a wavelength that stimulates the at least one species of rare earth ion.

8. The optical switch of claim 7, in which the at least one species of rare earth ion is $Er^{3+}$.

9. The optical switch of claim 7, in which the at least one species of one rare earth ion comprises $Er^{3+}$ and $Yb^{3+}$.

10. The optical switch of claim 7, in which the core includes silver atoms.

11. The optical switch of claim 7, in which the cladding is doped with at least one species of rare earth ion.

12. The optical switch of claim 7, in which the rare earth doped gain element is in an ON state when the optical pump power is coupled to the gain element.

13. The optical switch of claim 1, in which the gain element is switchable between an ON state and an OFF state.

* * * * *